US007295956B1

(12) United States Patent
Ruetsch (10) Patent No.: US 7,295,956 B1
(45) Date of Patent: Nov. 13, 2007

(54) METHOD AND APPARATUS FOR USING INTERVAL TECHNIQUES TO SOLVE A MULTI-OBJECTIVE OPTIMIZATION PROBLEM

(75) Inventor: Gregory R. Ruetsch, West Linn, OR (US)

(73) Assignee: Sun Microsystems, Inc, Santa Clara, CA (US)

( * ) Notice: Subject to any disclaimer, the term of this patent is extended or adjusted under 35 U.S.C. 154(b) by 877 days.

(21) Appl. No.: 10/691,868

(22) Filed: Oct. 22, 2003

Related U.S. Application Data (60) Provisional application No. 60/420,883, filed on Oct. 23, 2002.

(51) Int. Cl.
*G06F 17/10* (2006.01)
(52) U.S. Cl. ............... 703/2; 703/22; 703/9; 709/226; 715/500; 715/2; 715/7; 715/517; 705/36 R; 705/2; 706/2; 706/21; 706/45; 706/19
(58) Field of Classification Search .......... 706/45; 700/99, 2; 705/36 R, 2; 703/2; 716/2
See application file for complete search history.

(56) References Cited

U.S. PATENT DOCUMENTS

| 2001/0032029 A1* | 10/2001 | Kauffman ............... 700/99 |
| 2003/0014379 A1* | 1/2003 | Saias et al. ............. 706/45 |
| 2003/0055614 A1* | 3/2003 | Pelikan et al. ........... 703/2 |
| 2003/0233304 A1* | 12/2003 | Dhurandhar et al. ..... 705/36 |

OTHER PUBLICATIONS

Carlos Fonseca☐☐Multiobjective Genetic Algorithms with Application to Control Engineering Problems, Sep. 1995☐☐University of Sheffield, Department of Automatics Control and Systems engineering.*

* cited by examiner

*Primary Examiner*—Fred Ferris
*Assistant Examiner*—Cuong Van Luu
(74) *Attorney, Agent, or Firm*—Park, Vaughan & Fleming, LLP (57) ABSTRACT

One embodiment of the present invention provides a system that uses interval techniques to solve a multi-objective optimization problem. During operation, the system receives a representation of multiple objective functions $(f_1, \ldots, f_n)$ at a computer system, wherein $(f_1, \ldots, f_n)$ are scalar functions of a vector $x=(x_1, \ldots, x_n)$. The system also receives a representation of a domain of interest for the multiple objective functions. Next, the system performs an interval optimization process to compute guaranteed bounds on a Pareto front for the objective functions $(f_1, \ldots, f_n)$, wherein for each point on the Pareto front, an improvement in one objective function cannot be made without adversely affecting at least one other objective function. While performing the interval optimization process, the system applies a direct-comparison technique between subdomains of the domain of interest to eliminate subdomains that are certainly dominated by other subdomains.

18 Claims, 7 Drawing Sheets

METHOD AND APPARATUS FOR USING INTERVAL TECHNIQUES TO SOLVE A MULTI-OBJECTIVE OPTIMIZATION PROBLEM

RELATED APPLICATION

This application hereby claims priority under 35 U.S.C. §119 to U.S. Provisional Patent Application No. 60/420,883, filed on 23 Oct. 2002, entitled "Interval Algorithm for Multi-Objective Optimization," by inventor Gregory R. Ruetsch.

BACKGROUND

1. Field of the Invention

The present invention relates to techniques for solving optimization problems within computer systems. More specifically, the present invention relates to a method and an apparatus that uses interval techniques to solve a multi-objective optimization problem.

2. Related Art

In many real-world optimization problems, there are often several objectives that one would like to optimize. In such cases, rarely do the optima of each objective coincide. Hence, one is left with tradeoffs between the individual objectives that must be incorporated in the solution. The goal of multi-objective optimization is then to determine a set of points that describe the optimal trade-offs between objectives.

Figure 1:
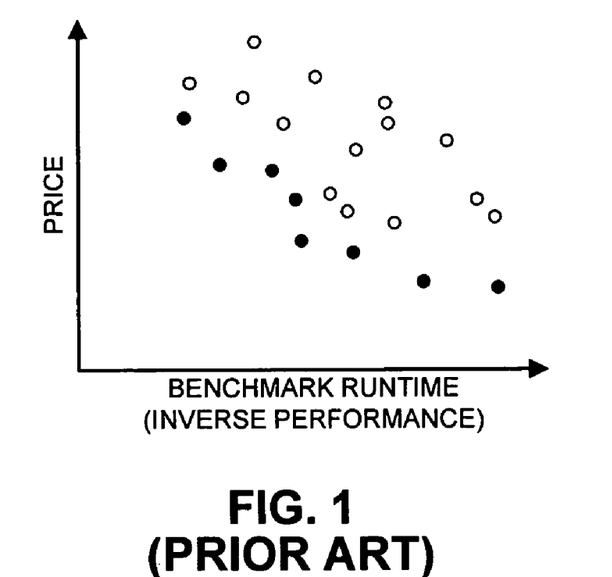
FIG. 1 presents a graph of price versus performance for computer systems.

An example of multi-objective optimization is that of minimizing price and maximizing performance. A common metric associated with these two objectives is the price-performance ratio. This number, however, oversimplifies the optimization problem. This oversimplification lies in the implicit assumption that a unit of price is equal to a unit of performance, which in general is not the case. For example, a college freshman and a national lab would most likely weight these two objectives differently when purchasing a computer. A more insightful approach to the problem is depicted in FIG. 1, which shows the price and runtime (inverse performance) of a set of points representing (fictitious) computers. Expressed in this manner, one would like to minimize each objective.

Unfortunately, minimizing both objectives simultaneously is generally not possible, and is not the case in this example. The best one can do is come up with an optimal trade-off, where it is not possible to improve one objective without degrading the other. The filled circles in FIG. 1 are points which exhibit this optimal trade-off, and comprise what is termed the "Pareto front." Obtaining the Pareto front is one of the goals of multi-objective optimization, both in identifying optimal points and in providing a sensitivity analysis. This sensitivity analysis considers the shape of the Pareto front. Convex portions of the Pareto front (points which lie on the convex hull of all points) indicate an ability to satisfy all objectives relative to regions of the Pareto front which are nonconvex (the "indented" region of Pareto front in FIG. 1).

In addition to determining the Pareto front, another goal of multi-objective optimization is to identify values of the objective functions' independent variables which are mapped to points on the Pareto front. In our example, processor speed, memory, system architecture, etc., are all independent variables (perhaps constrained) of both price and performance objective functions. One would like to know which sets of these independent variables map to points on the Pareto front. Such sets are termed "Pareto optimal sets."

While the application of intervals to solving the multi-objective optimization problem is new, there are a variety of methods for obtaining the Pareto front for analytical expressions. These methods include the weighted objective or aggregate function method, evolutionary algorithms (see "Zitzler, E., Deb, D., and L. Thiele (2000) "Comparison of Multiobjective Evolutionary Algorithms: Empirical Results," *Evolutionary Computing* 8(2): 173-195), and adjoint-gradient methods (see Nemec, M. and D. W. Zingg (2001) "Towards Efficient Aerodynamic Shape Optimization Based on the Navier-Stokes Equations," 15$^{th}$ *AIAA Computational Fluid Dynamics Conference*, AIAA 2001-2532). Each of these methods has its benefits and detractions. The aggregated function method turns the problem into a single objective optimization by weighting each objective. For example, if we have n objectives, $\{f_1, \ldots, f_n\}$, we wish to simultaneously minimize, then one can minimize the fitness function $$F = \sum_{i=1}^{n} w_i f_i(x)$$

for all combinations of $w_i$ such that $0 \leq w_i \leq 1$ and $$\sum_{i=1}^{n} w_i = 1.$$

Although simple in concept, there are several disadvantages to this method. The first is that uniform variations in the weightings space do not evenly map out the Pareto front. A second, and more substantial, disadvantage is that this method cannot capture nonconvex regions of the Pareto front. A third disadvantage is that the method does not guarantee finding all solutions. (Note that this disadvantage is to common to all existing solution methods.)

Hence, what is needed is a method and an apparatus for determining a Pareto front for a multi-objective optimization problem without the above-described problems.

SUMMARY

One embodiment of the present invention provides a system that uses interval techniques to solve a multi-objective optimization problem. During operation, the system receives a representation of multiple objective functions $(f_1, \ldots, f_n)$ at a computer system, wherein $(f_1, \ldots, f_n)$ are scalar functions of a vector $x=(x_1, \ldots, x_n)$. The system also receives a representation of a domain of interest for the multiple objective functions. Next, the system performs an interval optimization process to compute guaranteed bounds on a Pareto front for the objective functions $(f_1, \ldots, f_n)$, wherein for each point on the Pareto front, an improvement in one objective function cannot be made without adversely affecting at least one other objective function. While performing the interval optimization process, the system applies a direct-comparison technique between subdomains of the domain of interest to eliminate subdomains that are certainly dominated by other subdomains.

In a variation on this embodiment, performing the interval optimization process additionally involves applying a gradient technique to eliminate subdomains that do not contain local Pareto optima. A subdomain $[x]_i$ is eliminated by the gradient technique if an intersection of certainly negative gradient regions $C_j$ for each objective function $f_j$ is non-empty, $$\bigcap_{j=1}^{n} C_j([x]_j) \neq \varnothing,$$

wherein the certainly negative gradient region $C_j$ for objective function $f_j$ is the intersection of $\underline{N}_j([x]_i)$ (the negative gradient region associated with the minimum angle $\underline{\theta}_j$ of the gradient of $f_j$ over the subdomain $[x]_i$) and $\overline{N}_j([x]_i)$ (the negative gradient region associated with the maximum angle $\overline{\theta}_j$ of the gradient of $\theta_j$ over the subdomain $[x]_i$).

In a further variation, the system performs an iterative process that, (1) bisects remaining subdomains that have not been eliminated by the gradient technique, and (2) applies the gradient technique to eliminate bisected subdomains that do not contain a local Pareto optimum.

In a further variation, bisecting a subdomain involves bisecting the subdomain in the direction that has the largest width of partial derivatives of all objective functions $(f_1, \ldots, f_n)$ over the subdomain.

In a further variation, the direct-comparison technique is applied once for every n iterations of the gradient technique.

In a further variation, the iterations continue until either a predetermined maximum number of iterations are performed, or the largest area of any subdomain is below a predetermined value.

In a variation on this embodiment, a subdomain U certainly dominates a subdomain V if every point u∈U dominates every point v∈V, wherein a point u dominates a point v under minimization if, $u_i \leq v_i$, i=1, ..., n, and $u_i < v_i$ for some i∈{1, ..., n}.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs).

Interval Computations

Note that interval computation provides an automatic means for bounding roundoff error. Rather than representing a number by a single floating point value, which may or may not exist in machine representation, an interval represents a number by machine representable lower and upper bounds which contain the desired value. Interval computation uses directed or outward rounding such that the resulting interval always contains the mathematical result. In addition to bounding roundoff error, interval computation provides a rich environment for performing set theoretic operations. One of the most powerful aspects of interval computation, however, is that in performing a single function evaluation over an interval, one obtains rigorous bounds of that function over the entire interval. Depending on the value of these bounds, one can prove or disprove certain conjectures. We leverage this feature in multi-objective optimization to eliminate subdomains in which we can prove no point is Pareto optimal. In doing so, we capture all Pareto optimal points. In essence, intervals allow one to develop computer techniques, which deal with continua rather than discrete points, and as a result one can perform proofs via computers.

In the next section we utilize the objective function derivatives to formulate a differential definition for local Pareto optima, which will become the basis for the interval-differential formulation. We later present two complimentary techniques for solving the multi-objective problem: (1) a direct-comparison technique, which can be used to solve the global problem, but suffers from inefficiency, and (2) an interval version of the differential formulation, which efficiently solves for local optima. The combination of these two interval techniques results in a composite technique, which is guaranteed to find all global Pareto optimal sets and their projection on the Pareto front.

Multi-Objective Concepts and Definitions

In this section, we briefly formalize concepts and define terms used in multi-objective optimization. We begin by presenting an analytical example, and once the multi-objective optimization concepts have been established through this example, we generalize the concepts.

Consider a case with two objective functions which represent the distance of a point $(x_1, x_2)$ from points $(-½, 0)$ and $(½, 0)$, $$f_1(x_1, x_2) = \sqrt{\left(x_1 + \frac{1}{2}\right)^2 + x_2^2} \quad f_2(x_1, x_2) = \sqrt{\left(x_1 - \frac{1}{2}\right)^2 + x_2^2} \quad (1)$$

which we want to minimize in a two-dimensional domain $$(x_1, x_2) \epsilon ([-1,1], [-½, ½])$$

The individual minima of $f_1$ and $f_2$ are the points $(-½, 0)$ and $(½, 0)$, respectively, so the objectives are minimized at different points in the domain, as is generally the case in multi-objective optimization. What we hope to achieve for such a set of objective functions is an optimal trade-off in objectives. This optimal trade-off can be determined by projecting all the points in this domain into objective space, as depicted in FIG. 2.

Figure 2:
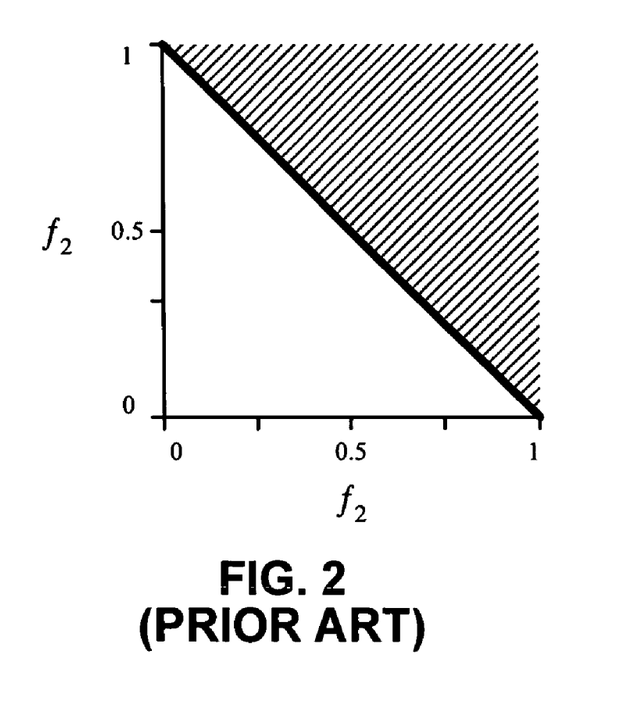
FIG. 2 depicts a Pareto front.

In FIG. 2 the projection of points $(x_1, x_2) \epsilon ([-1,1], [-½, ½])$ into objective space $(f_1, f_2)$ is indicated by the cross-hatched region. (Some points are projected above and to the right of the crosshatched region). The points which lie on the bold line comprise the Pareto front for this pair of functions. Points on the Pareto front are nondominated, in that no point exists that can improve one objective without degrading the other.) When projected to objective space, the points in this domain fill the region above the diagonal line. The diagonal line is called the "Pareto front" and represents the optimal trade-off in that there can be no improvement towards minimizing one objective which doesn't adversely affect the other objective. (Since the minimum of each objective is zero, this condition can be interpreted geometrically by requiring the rectangle whose diagonal connects the origin and the point in question to be empty.) On the other hand, all points which lie above the Pareto front can simultaneously improve both objectives by moving towards the Pareto front.

Figure 3:
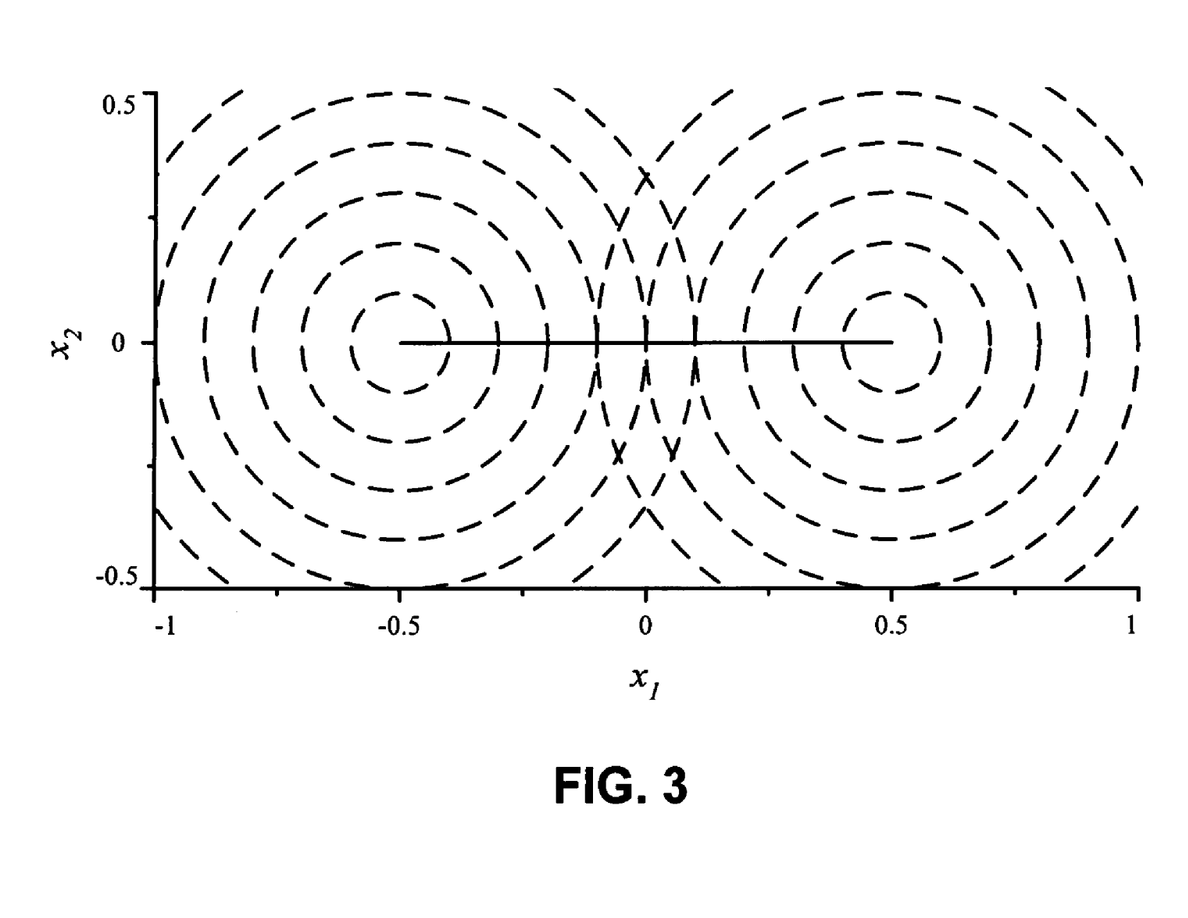
FIG. 3 illustrates a Pareto optimal set.

In addition to determining the Pareto front, the corresponding points in the domain $(x_1, x_2)$ which project onto the Pareto front are desired. Such a point is called "Pareto optimal," and the collection of all such points the "Pareto optimal set." For our example, the Pareto optimal set includes all points in the line segment connecting the two individual minima, depicted in FIG. 3. FIG. 3 illustrates contours (dashed lines) and the Pareto optimal set (solid line) for functions $f_1$ and $f_2$ in Equation (1). The value of these functions are the distances from points $(-½, 0)$ and $(+½, 0)$, respectively, which result in the circular contours. The Pareto optimal set for this example comprises the points on the line connecting the two individual minima, and projects into the Pareto front in objective space. Note that any point in the domain that is not in the optimal Pareto set can improve both objectives by moving along a path towards the line which comprises the Pareto optimal set.

With the concepts of Pareto front and Pareto optimal set for the above analytical expressions established, we now turn our attention to generalizing these concepts to a case with n objective functions in a D-dimensional domain. In order to generalize the Pareto front to n dimensions, it is useful to establish the concept of dominance. If u and v are n-dimensional vectors, then under minimization u is said to dominate v, denoted as u≺v, if:

$u_i \leq v_i$, i=1, ..., n; and $u_i < v_i$ for some i∈{1, ..., n}.

Applying dominance to the Pareto concepts, we say the Pareto front contains points which are nondominated solutions: solutions where an improvement in one objective cannot be made without adversely affecting at least one other objective. Generally, if we wish to minimize n objectives $\{f_1, \ldots, f_n\}$ within a particular domain $\Omega$ of a D-dimensional space $x=(x_1, \ldots, x_D)$, and we define an objective vector $f(x)=(f_1(x), \ldots, f_n(x))$, then a point $x \epsilon \Omega$ is Pareto optimal if:

$$f(x') \not\prec f(x) \forall x' \epsilon \Omega \quad (2)$$

The definition of Pareto optima in Equation (2) utilizes the function evaluations. This point definition becomes the basis for the interval direct-comparison method in a following section. In the next section we utilize the objective function derivatives to formulate a differential definition for local Pareto optima, which will become the basis for the interval-differential formulation.

Differential Formulation

If the objective functions $\{f_1(x), \ldots, f_n(x)\}$ are continuous and differentiable, then it is helpful to leverage the gradient information of these functions in determining local Pareto optima. Just as finding local extrema in single-objective optimization does not guarantee that these points are global extrema, finding local Pareto optima does not imply that these points are contained in the Pareto optimal set. However, finding points that are local Pareto optima can assist in obtaining the Pareto optimal set. This is especially true in the case of interval methods, where consistency checks can be combined with capturing local optima to determine global optima.

Local Pareto optimality requires that at a point x, no differential displacement vector δr exists such that:

$$f(x+\delta r) \prec f(x).$$

If we denote $d(x, \delta r)$ as the vector of directional derivatives of the objective functions along δr:

$$d_i(x, \delta r) = \nabla f_i|_x \cdot \delta r;$$

then a Taylor expansion of f(x) results in the condition for local Pareto optimality: a point x is locally Pareto optimal if there is no differential displacement vector δr such that:

$$d(x, \delta r) \prec Z \quad (3)$$

where Z is the zero vector, i.e. $Z_i=0$ for i=1, ..., n.

The condition of Equation (3) can be geometrically interpreted as follows. For each objective there is a (D−1)-dimensional plane which is normal to the gradient of $f_i$ at a point x. This plane delineates two semi-infinite regions, one where the local (linearized) gradient is positive, and one where it is negative. Any differentially small displacement into the negative gradient region results improving the objective function, and Equation (3) is satisfied when the intersection of the such regions, one for each objective, is empty. If we represent the negative gradient region for $f_i$ at point x by $N_i(x)$, then Equation (3) is satisfied when:

$$\bigcap_{i=1}^{n} N_i(x) \cap \Omega = \varnothing \qquad (4)$$

The domain $\Omega$ appears here in order to account for points which lie on the boundary of $\Omega$. In effect, for points on the boundary, this acts like an additional objective function. For interior points, the presence of $\Omega$ is inconsequential.

Figure 4A:
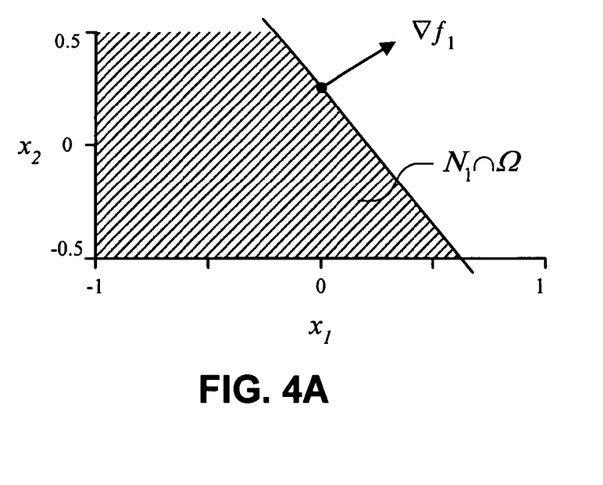
FIG. 4A illustrates a non-positive gradient region for a first objective function in accordance with an embodiment of the present invention.
Figure 4B:
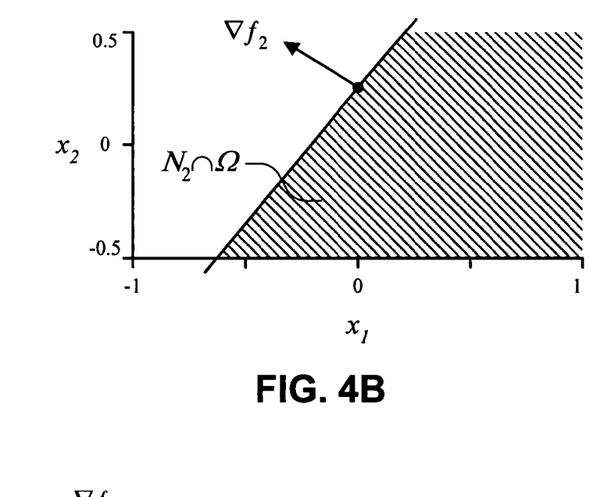
FIG. 4B illustrates a non-positive gradient region for a second objective function in accordance with an embodiment of the present invention.
Figure 4C:
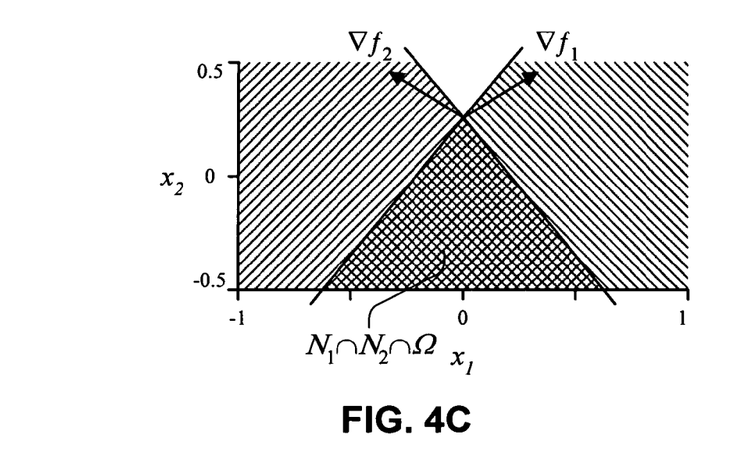
FIG. 4C illustrates overlapping non-positive gradient regions in accordance with an embodiment of the present invention.

The application of the condition in Equation (4) to the example problem in Equation (1) is demonstrated in FIGS. 4A-4C. In FIGS. 4A and 4B, the objectives $f_1$ and $f_2$ are dealt with separately. In each plot, the gradient of the objective at some point is drawn, along with $N_i \cap \Omega$ (the intersection of the negative gradient region and the domain) by the shaded regions. In FIG. 4C, these two figures are combined, showing a nonempty region corresponding to $N_1 \cap N_2 \cap \Omega$. Any differential displacement into this cross-hatched region will improve both objectives, and as a result the point is not locally Pareto optimal.

Figure 5A:
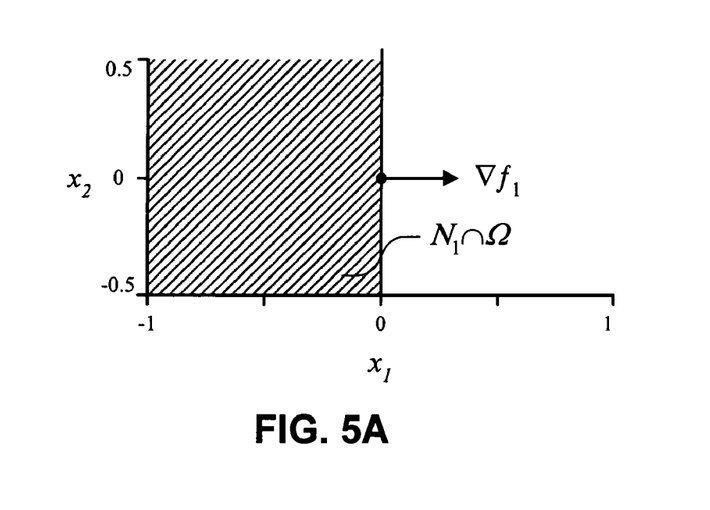
FIG. 5A illustrates a first non-positive gradient region for a point which is Pareto optimal in accordance with an embodiment of the present invention.
Figure 5B:
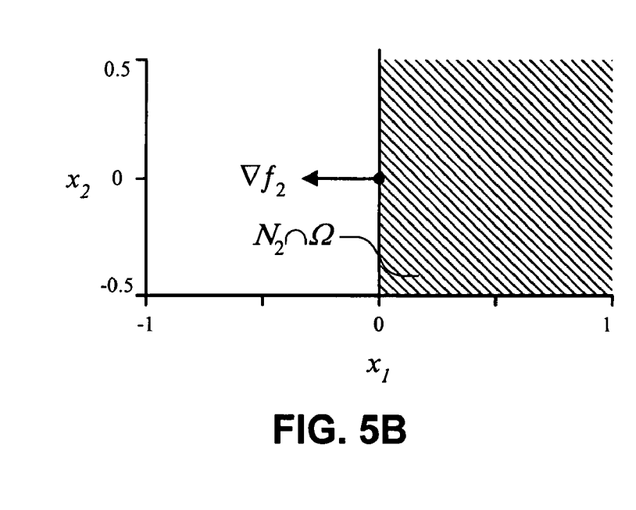
FIG. 5B illustrates a second non-positive gradient region for the point which is Pareto optimal in accordance with an embodiment of the present invention.

FIGS. 5A and 5B illustrate negative gradient regions $N_i$ at a point which is Pareto optimal. $N_1$ and $N_2$ are shown independently in the two diagrams. Here the gradients are co-linear but opposite in direction, and as such the intersection $N_1 \cap N_2$ is empty. Therefore, this point is locally Pareto optimal. Note that the only way an interior point in a two-objective optimization problem can be Pareto optimal is when the gradients are co-linear but opposite.

In this section, we have established a differential formulation for identifying local Pareto optima. Application of this methodology as it stands is difficult in that one needs to perform this evaluation at every point in domain $\Omega$. One can devise many "shotgun" methods using this differential formulation, such as seeding the domain with points and using the gradient information to traject points towards the optimal Pareto set. The problem with such methods is that they are not guaranteed to capture all Pareto optima. In the next section, we apply interval methods to the differential formulation which, along with in interval version of Equation (2), results in a technique which is guaranteed to capture all Pareto optima.

Interval Concepts

Interval methods grew out of the desire to control round-off error in floating point computations. The idea is that rather than using a single floating point value to represent a number, which would incur an error if the number is not machine representable, a number is represented by upper and lower bounds which are machine representable. Interval arithmetic is performed in a way to guarantee containment. Intervals are described in more detail in U.S. Pat. No. 6,629,120, entitled "Method and Apparatus for Performing a Mask-Driven Interval Multiplication Operation," by inventors William G. Walster and Dmitri Chiraev.

In addition to operators for arithmetic and function evaluation, intervals have a rich set of relational operators. There are certainly true operations, for example:

$$X^c < Y \Leftrightarrow x \leq y \; \forall x \in X \text{ and } y \in Y$$

as well as possibly true operations:

$$X^p < Y \Leftrightarrow \exists x \in X \text{ and } y \in Y | x < y$$

These same ideas hold for all relational operators.

Now that some basic concepts of interval arithmetic and computation have been discussed, we apply these concepts to multi-objective optimization, starting with the interval definition of dominance.

Interval Dominance And The Direct-comparison Method

We can extend the notions of certainly and possibly used to define the basic interval relational operators to that of dominance. An interval vector $U=(U_1(x), \ldots, U_n(x))$ certainly dominates an interval vector $V$ according to the following definition:

$$U^c \prec V \Leftrightarrow u \prec V \; \forall u \in U \text{ and } v \in V \qquad (6)$$

In terms of the infima and suprema of the components of $U$ and $V$, we say that $U^c \prec V$ if:

$\overline{u_i} \leq \underline{v_i}$ $i=1, \ldots, n$ and
$\overline{u_i} < \overline{v_i}$ for some $i \in \{1, \ldots, n\}$.

Likewise, $U$ is said to possibly dominate $V$, denoted as $U \prec V$ if:

$\underline{u_i} \leq \overline{v_i}$ $i=1, \ldots, n$.

One could apply the definition of certain dominance directly to obtain an interval technique for determining the Pareto front. One would simply search over a set of subdomains covering the domain $\Omega$, and eliminate any subdomains which were certainly dominated. Then the remaining subdomains would be bisected, and the procedure is repeated until some stopping criterion is met.

While this method will work in that no Pareto optimal points will be eliminated, there are several disadvantages inherent in this method. The main disadvantage is that the number of comparisons to determine certain dominance grows rapidly with number of subdomains. Performance-wise this becomes costly as the Pareto front is refined.

One aspect of this direct-comparison method that is both advantageous and disadvantageous is that it is a global method. This is disadvantageous with respect to parallelization in a clustered environment—some message passing is needed for comparison between all subdomains within an iteration. The global nature of the direct-comparison method is advantageous in that it results in global Pareto optima. This is important since the interval version of the differential formulation produces all the local Pareto optima, and some consistency check is needed to eliminate those local optima which are not global. The direct-comparison method provides this consistency check. Having developed the direct-comparison method, the only remaining piece in obtaining a complete technique is to extend the differential formulation to intervals.

Interval-differential Formulation

In the direct-comparison method above, we used the concept of certain dominance through the evaluation of the objectives over intervals to eliminate subdomains, which are certainly dominated, and therefore contain no Pareto optimal points. In the interval-differential formulation, we again look to develop a criterion which enable us to remove subdomains which are certainly dominated, however this criterion is based on the objective function derivatives.

In the point differential formulation, determining local Pareto optima requires the evaluation of the gradient of objective functions. The magnitude of the gradients is inconsequential to the formulation, it is the direction of the gradients that determined the negative gradient regions, $N_i$, and therefore local dominance. In a D-dimensional domain, the direction of the gradient of each objective function can parameterized by D–1 variables. For example, in the two-dimensional domain of Equation (1), we can define the direction of the gradient of the j-th objective by the angle $\theta_j$. If we extend this to intervals, then the interval gradient of the j-th objective function evaluated over the i-th subdomain, $[x]_i$, is:

$$G_j([x]_i) = [\nabla f_j]([x]_i)$$

takes on a range of directions $[\underline{\theta}_j, \overline{\theta}_j]$. Associated with this range of directions is a range of semi-infinite negative gradient region, denoted as $N_j$. Formally we have:

$$N_j(x) \subset N_j([x]_i) \forall x \in [x]_i$$

In the point differential formulation, regions where the intersection of the domain and all $N_j$ is non-empty indicated that such a point is not Pareto optimal. We now extend this idea to the interval case. To eliminate a subdomain, we need to establish that every point x in this subdomain satisfies:

$$\bigcap_{j=1}^{n} N_j(x) \neq \varnothing. \quad (7)$$

The intersection with the entire domain $\Omega$ is not included here, as it was in the point formulation—we consider boundary points later in this section. We would like to find an expression analogous to Equation (7) using $N_j$. Suppose we can determine a certainly negative gradient region for objective $f_j$, denoted by $C_j$, which is defined as the subset of $N_j$ that is common to $N_j(x)$ for all $x \in [X]_i$:

$$C_j([x]_i) \subset N_j(x) \ \forall x \in [x]_i$$

With knowledge of $C_j$ we can guarantee that Equation (7) holds at all points in the subdomain if:

$$\bigcap_{j=1}^{n} C_j([x]_i) \neq \varnothing.$$

Figure 6A:
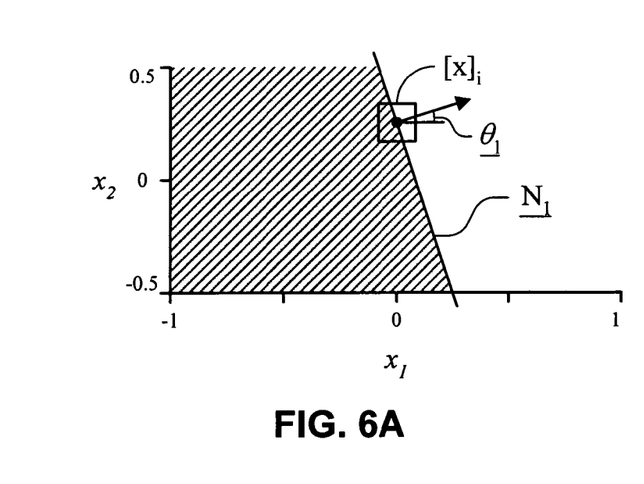
FIG. 6A illustrates a non-positive gradient region associated with a minimum gradient angle for a subdomain in accordance with an embodiment of the present invention.
Figure 6B:
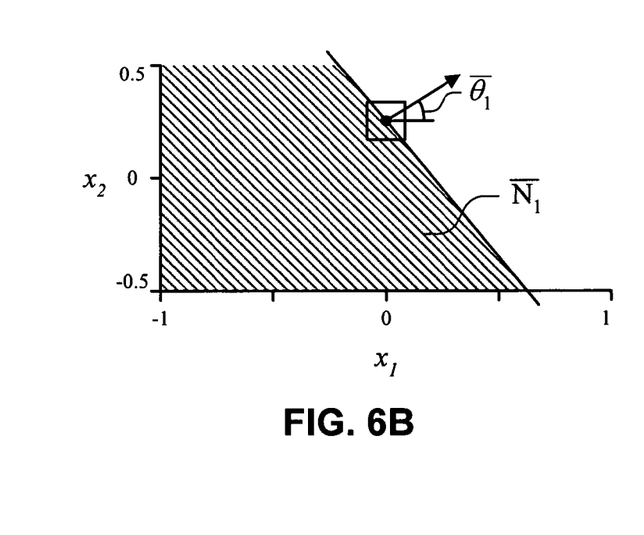
FIG. 6B illustrates a non-positive gradient region associated with a maximum gradient angle for the subdomain in accordance with an embodiment of the present invention.
Figure 6C:
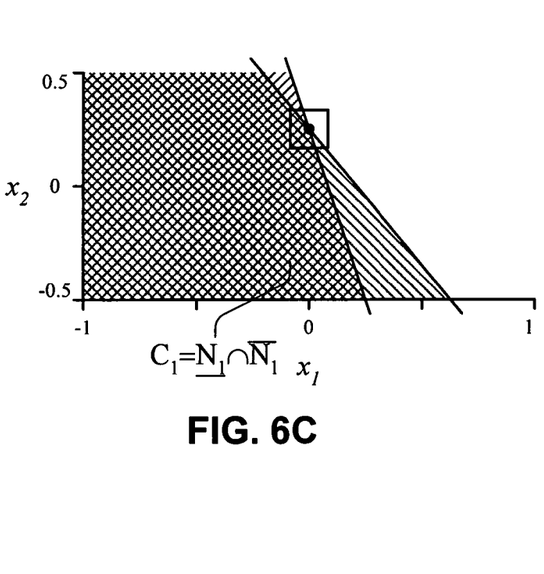
FIG. 6C illustrates a certain non-positive gradient region for the subdomain in accordance with an embodiment of the present invention.

The remaining issue is to determine $C_j([x]_i)$. This region is drawn for a single objective, $f_1$, in FIGS. 6A-6B. FIG. 6A shows the negative gradient region of $f_1$ associated with the minimal angle $\underline{\theta}_+$, of the gradient over the subdomain $[x]_i$. FIG. 6B shows the negative gradient region of $f_1$ associated with the maximum angle $\overline{\theta}_1$ of the gradient over this subdomain. These negative gradient regions are denoted by $\underline{N}_+$ and $\overline{N}_1$, respectively. FIG. 6C shows the intersection of these two regions, which defines the certainly negative gradient region for objective $f_1$. We can define such a region for all objectives:

$$C_j = \underline{N}_j([x]_i) \cap \overline{N}_j([x]_i)$$

As a result, we now have a condition which, when satisfied, shows that every point in a subdomain $[x]_i$ is not locally, and therefore not globally, Pareto optimal:

$$\bigcap_{j=1}^{n} \left( \underline{N}_j([x]_i) \cap \overline{N}_j([x]_i) \right) \neq \varnothing. \quad (8)$$

The boundary of $\Omega$ in the point formulation was accounted for by taking the intersection of the $N_i$'s with the domain $\Omega$. When operating over a finite area subdomain, there is no extension to account for the boundary in such a simple manner. One needs to account for the boundaries separately. For example, for two objective functions $f_1$ and $f_2$ in a domain of $x \in ([-1,1], [-\frac{1}{2}, \frac{1}{2}])$, one needs to solve two problems. The first using $C_1 \cap C_2$, or Equation (8), as a criterion for eliminating subdomains in the interior, and the second using $C_1 \cap C_2 \cap \Omega$ as a criterion for eliminating subdomains of the semi-degenerate intervals $(-1, [-\frac{1}{2}, \frac{1}{2}])$, $(1, [-\frac{1}{2}, \frac{1}{2}])$, $([-1,1], -\frac{1}{2})$, and $([-1,1], \frac{1}{2})$. An application of the direct-comparison method over all subdomains from these various regions merges these separate optimization problems.

The criterion in Equation (8) for eliminating subdomains which do not contain any local Pareto optima, along with the definition of interval dominance of Equation (6) which be used to eliminate subdomains which are not global Pareto optimal, can be combined in a robust and efficient implementation of a multi-objective optimization code. Equation (8) provides an efficient means for computing local Pareto optima, and Equation (6) can be applied as a consistency check to eliminate any regions which are local but not global optima.

System Implementation

One embodiment of the present invention implements a system that uses the interval-differential formulation, from Equation (8), and the direct-comparison method, from Equation (6). This embodiment includes a single loop, which performs eliminations of subdomains within each "generation" or iteration.

Figure 7:
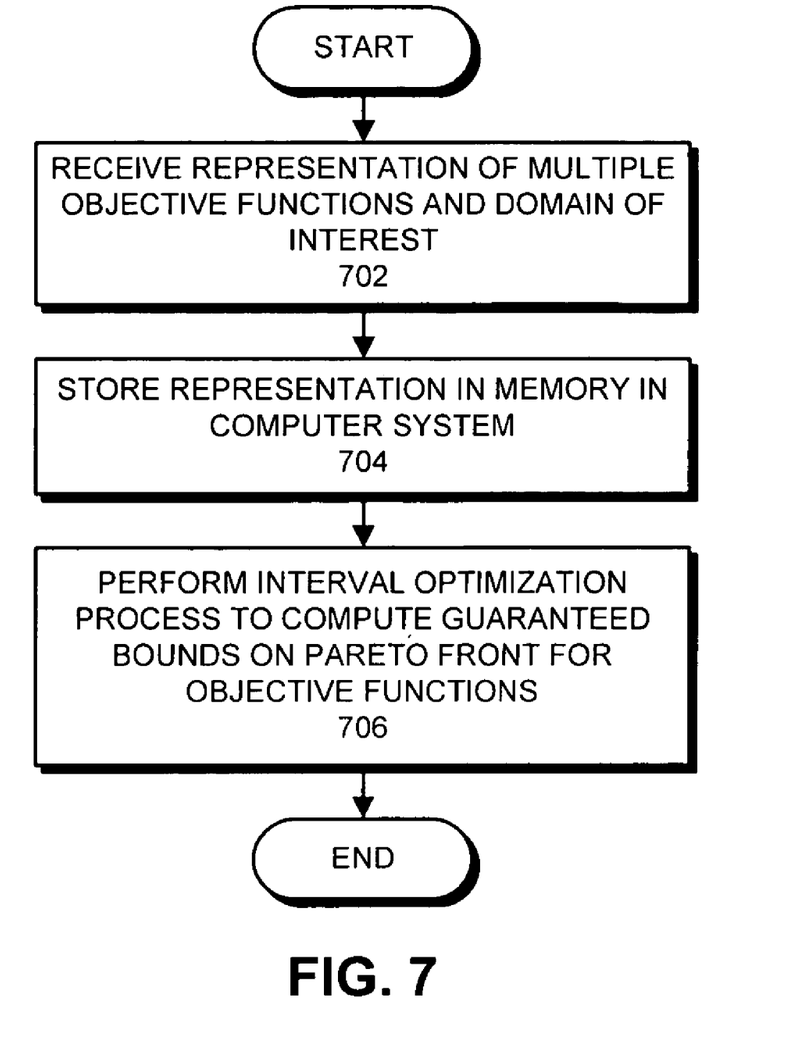
FIG. 7 presents a flow chart of an interval optimization process for a multi-objective function in accordance with an embodiment of the present invention.

Referring to the flowchart in FIG. 7, the system first receives a representation of multiple objective functions $(f_1, \ldots, f_n)$ and a domain of interest (step 702). Next, the system stores this representation in a memory in a computer system (step 704), and performs an interval optimization process to compute guaranteed bounds on the Pareto front for the multiple objective functions (step 706).

The initial condition, or first iteration, of this loop operates on a single "subdomain" which covers the entire domain of interest. Referring to the flowchart in FIG. 8, every few iterations through the loop a consistency check for global Pareto optima is performed using the direct-comparison method from Equation (6) (step 802). This eliminates any subdomains which are certainly dominated (step 802). The frequency at which the direct-comparison method occurs is a parameter set by the user.

Figure 8:
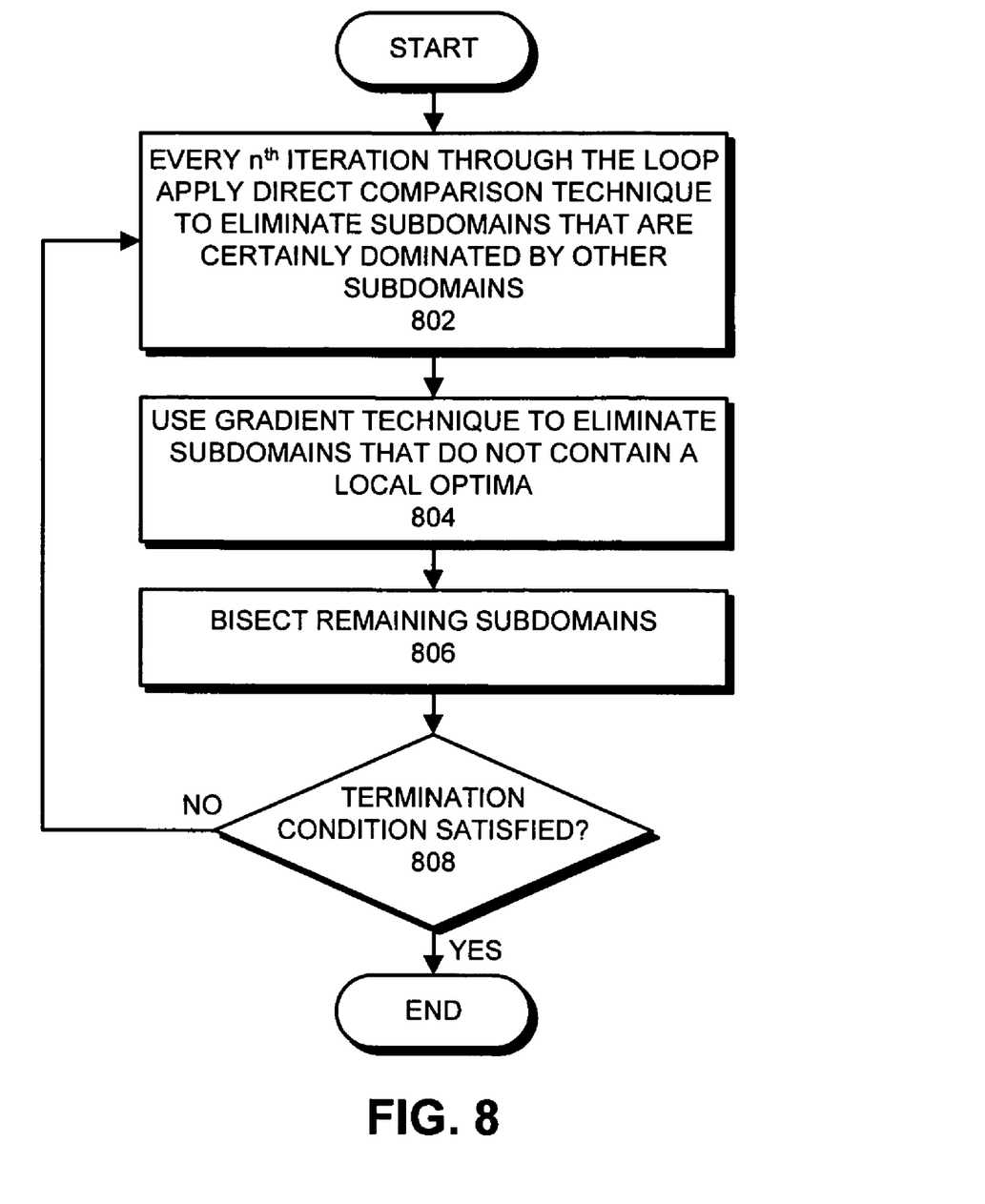
FIG. 8 presents a more-detailed flow chart for the interval optimization process in accordance with an embodiment of the present invention.

Next, the loop determines if the subdomains can be eliminated on grounds of not containing a local Pareto optimum via the interval-differential formulation in Equation (8) (step 804). The certainly negative gradient regions are represented by interval angles.

To accommodate problems of more than two independent variables, one simply considers the projections of $\underline{N}_j([x]_i)$ and $\overline{N}_j([x]_i)$ on all possible two-dimensional coordinate planes. For the case of two independent variables, one finds certainly negative gradient regions on the $x_1$-$x_2$ plane. In three dimensions this is done on three planes, $(X_1$-$X_2, x_1$-$x_3,$ and $x_2$-$x_3)$, and in D dimensions this operation is performed on $D(D-1)$ such planes. Since the semi-infinite regions $\underline{N}_j([x]_i)$ and $\overline{N}_j([x]_i)$ are bounded by D-dimensional planes, the projection of these regions into each two-dimensional subspace is simply done using the appropriate partial derivatives for the subspace to form the gradient, and then proceeding as if it were a two-dimensional problem.

The intersection of the certainly negative gradient regions within each coordinate plane is performed using these interval angles, accounting for branch cuts when required. While the number of coordinate planes is O(D²) in number of dimensions, one must remember that the operation performed on each coordinate plane is a simple intersection. The evaluation of the objective gradients, which in general is more time-consuming, is only O(D).

If the intersection of certainly negative gradient regions for all such planes is nonempty, then the subdomain can be removed, meaning they are not advanced into the next iteration. The subdomains that do not satisfy this condition are bisected (step 806). The bisection is performed in the direction that has the largest width of partial derivatives of all objective functions over the subdomain. The rationale behind bisecting in this direction is that we want the next iteration of subdomains to have the certain negative gradient regions as large as possible, thus increasing the likelihood that $C_j \neq \emptyset$. This is achieved if we bisect a subdomain in the direction where the largest width of the objective functions' partial derivative occurs.

At the end of the loop the system determines if a termination condition is satisfied (step 808). For example, the termination condition can be satisfied if either a specified number of iterations is performed, or the largest area of any interval box $(F_1([x]_i, F_2([x]_i)$ is below some user specified value. If the termination condition is satisfied, the process is complete. Otherwise, the system returns to step 802 to perform another loop iteration.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for using interval techniques within a computer system to solve a multi-objective optimization problem, comprising:

receiving a representation of multiple objective functions $(f_1, \ldots, f_n)$ at the computer system, wherein $(f_1, \ldots, f_n)$ are scalar functions of a vector $x=(x_1, \ldots, x_n)$;

receiving a representation of a domain of interest for the multiple objective functions;

storing the representations in a memory within the computer system; and performing an interval optimization process to compute guaranteed bounds on a Pareto front for the objective functions $(f_1, \ldots, f_n)$, wherein for each point on the Pareto front, an improvement in one objective function cannot be made without adversely affecting at least one other objective function;

wherein performing the interval optimization process involves applying a direct-comparison technique between subdomains of the domain of interest to eliminate subdomains that are certainly dominated by other subdomains, wherein performing the interval optimization process involves applying a gradient technique to eliminate subdomains that do not contain a local Pareto optimum, wherein a subdomain $[x]_i$ is eliminated by the gradient technique if an intersection of certainly negative gradient regions $C_j$ for each objective function $f_j$ is nonempty, $$\bigcap_{j=1}^{n} C_j([x]_j) \neq \emptyset,$$

and wherein the certainly negative gradient region $C_j$ for objective function $f_j$ is the intersection of $\underline{N}_j([x]_i)$ (the negative gradient region associated with the minimum angle $\underline{\theta}_j$ of the gradient of $f_j$ over the subdomain $[x]_i$) and $\overline{N}_j([x]_i)$ (the negative gradient region associated with the maximum angle $\overline{\theta}_j$ of the gradient of $f_j$ over the subdomain $[x]_i$).

2. The method of claim 1, wherein the method further comprises iteratively:

bisecting remaining subdomains that have not been eliminated by the gradient technique; and applying the gradient technique to eliminate bisected subdomains that do not contain a local Pareto optimum.

3. The method of claim 2, wherein bisecting a subdomain involves bisecting the subdomain in the direction that has the largest width of partial derivatives of all objective functions $(f_1, \ldots, f_n)$ over the subdomain.

4. The method of claim 2, wherein the direct-comparison technique is applied once for every n iterations of the gradient technique.

5. The method of claim 4, wherein the iterations continue until either a predetermined maximum number of iterations are performed, or the largest area of any subdomain is below a predetermined value.

6. The method of claim 1, wherein a subdomain U certainly dominates a subdomain V if every point u∈U dominates every point v∈V; and wherein a point u dominates a point v under minimization if, $u_i \#v_i$, i=1, \ldots, n, and $u_i < v_i$ for some $i \in \{1, \ldots, n\}$.

7. A computer-readable storage medium storing instructions that when executed by a computer cause the computer to perform a method for using interval techniques within a computer system to solve a multi-objective optimization problem, wherein the computer-readable storage medium can be any device that can store code and/or data for use by a computer system, the method comprising:

receiving a representation of multiple objective functions $(f_1, \ldots, f_n)$ at the computer system, wherein $(f_1, \ldots, f_n)$ are scalar functions of a vector $X=(x_1, \ldots, x_n)$;

receiving a representation of a domain of interest for the multiple objective functions;

storing the representations in a memory within the computer system; and performing an interval optimization process to compute guaranteed bounds on a Pareto front for the objective functions $(f_1, \ldots, f_n)$, wherein for each point on the Pareto front, an improvement in one objective function cannot be made without adversely affecting at least one other objective function;

wherein performing the interval optimization process involves applying a direct-comparison technique between subdomains of the domain of interest to eliminate subdomains that are certainly dominated by other subdomains, wherein performing the interval optimization process involves applying a gradient technique to eliminate subdomains that do not contain a local Pareto optimum, wherein a subdomain $[x]_i$ is eliminated by the gradient technique if an intersection of certainly negative gradient regions $C_j$ for each objective function $f_j$ is non-empty, $$\bigcap_{j=1}^{n} C_j([x]_j) \neq \varnothing,$$

and wherein the certainly negative gradient region $C_j$ for objective function $f_j$ is the intersection of $\underline{N}_j([x]_i)$ (the negative gradient region associated with the minimum angle $\underline{\theta}_j$ of the gradient of $f_j$ over the subdomain $[x]_i$) and $\overline{N}_j([x]_i)$ (the negative gradient region associated with the maximum angle $\overline{\theta}_j$ of the gradient of $f_j$ over the subdomain $[x]_i$).

8. The computer-readable storage medium of claim 7, wherein the method further comprises iteratively:
bisecting remaining subdomains that have not been eliminated by the gradient technique; and
applying the gradient technique to eliminate bisected subdomains that do not contain a local Pareto optimum.

9. The computer-readable storage medium of claim 8, wherein bisecting a subdomain involves bisecting the subdomain in the direction that has the largest width of partial derivatives of all objective functions $(f_i, \ldots, f_n)$ over the subdomain.

10. The computer-readable storage medium of claim 8, wherein the direct-comparison technique is applied once for every n iterations of the gradient technique.

11. The computer-readable storage medium of claim 10, wherein the iterations continue until either a predetermined maximum number of iterations are performed, or the largest area of any subdomain is below a predetermined value.

12. The computer-readable storage medium of claim 7, wherein a subdomain U certainly dominates a subdomain V if every point u∈U dominates every point v∈V; and
wherein a point u dominates a point v under minimization if,
$u_i \# v_i$ i=1, ..., n, and
$u_i < v_i$ for some i∈{1, ..., n}.

13. An apparatus that uses interval techniques to solve a multi-objective optimization problem, comprising:
a receiving mechanism configured to receive a representation of multiple objective functions $(f_1, \ldots, f_n)$, wherein $(f_1, \ldots, f_n)$ are scalar functions of a vector $x=(x_1, \ldots, x_n)$;
wherein the receiving mechanism is configured to receive a representation of a domain of interest for the multiple objective functions;
a memory configured to store the representations; and
an interval optimizer configured to performing an interval optimization process to compute guaranteed bounds on a Pareto front for the objective functions $(f_1, \ldots, f_n)$, wherein for each point on the Pareto front, an improvement in one objective function cannot be made without adversely affecting at least one other objective function;

wherein the interval optimizer is configured to apply a direct-comparison technique between subdomains of the domain of interest to eliminate subdomains that are certainly dominated by other subdomains, wherein the interval optimizer is configured to apply a gradient technique to eliminate subdomains that do not contain a local Pareto optimum, wherein a subdomain $[x]_i$ is eliminated by the gradient technique if an intersection of certainly negative gradient regions $C_j$ for each objective function $f_j$ is non-empty, $$\bigcap_{j=1}^{n} C_j([x]_j) \neq \varnothing,$$

and wherein the certainly negative gradient region $C_j$ for objective function $f_j$ is the intersection of $\underline{N}_j([x]_i)$ (the negative gradient region associated with the minimum angle $\underline{\theta}_j$ of the gradient of $f_j$ over the subdomain $[x]_i$) and $\overline{N}_j([x]_i)$ (the negative gradient region associated with the maximum angle $\overline{\theta}_j$ of the gradient of over the subdomain $[x]_i$).

14. The apparatus of claim 13, wherein the interval optimizer is configured to iteratively:
bisect remaining subdomains that have not been eliminated by the gradient technique; and to
apply the gradient technique to eliminate bisected subdomains that do not contain a local Pareto optimum.

15. The apparatus of claim 14, wherein bisecting a subdomain involves bisecting the subdomain in the direction that has the largest width of partial derivatives of all objective functions $(f_1, \ldots, f_n)$ over the subdomain.

16. The apparatus of claim 14, wherein the direct-comparison technique is applied once for every n iterations of the gradient technique.

17. The apparatus of claim 16, wherein the iterations continue until either a predetermined maximum number of iterations are performed, or the largest area of any subdomain is below a predetermined value.

18. The apparatus of claim 13,
wherein a subdomain U certainly dominates a subdomain V if every point u∈U dominates every point v∈V; and
wherein a point u dominates a point v under minimization if,
$u_i \# v_i$, i=1, ..., n, and
$u_i < v_i$ for some i∈{1, ...,n}.

* * * * *